J. W. NISSROD.
STUMP PULLER.
APPLICATION FILED NOV. 22, 1920.
1,420,736.
Patented June 27, 1922.
2 SHEETS—SHEET 1.
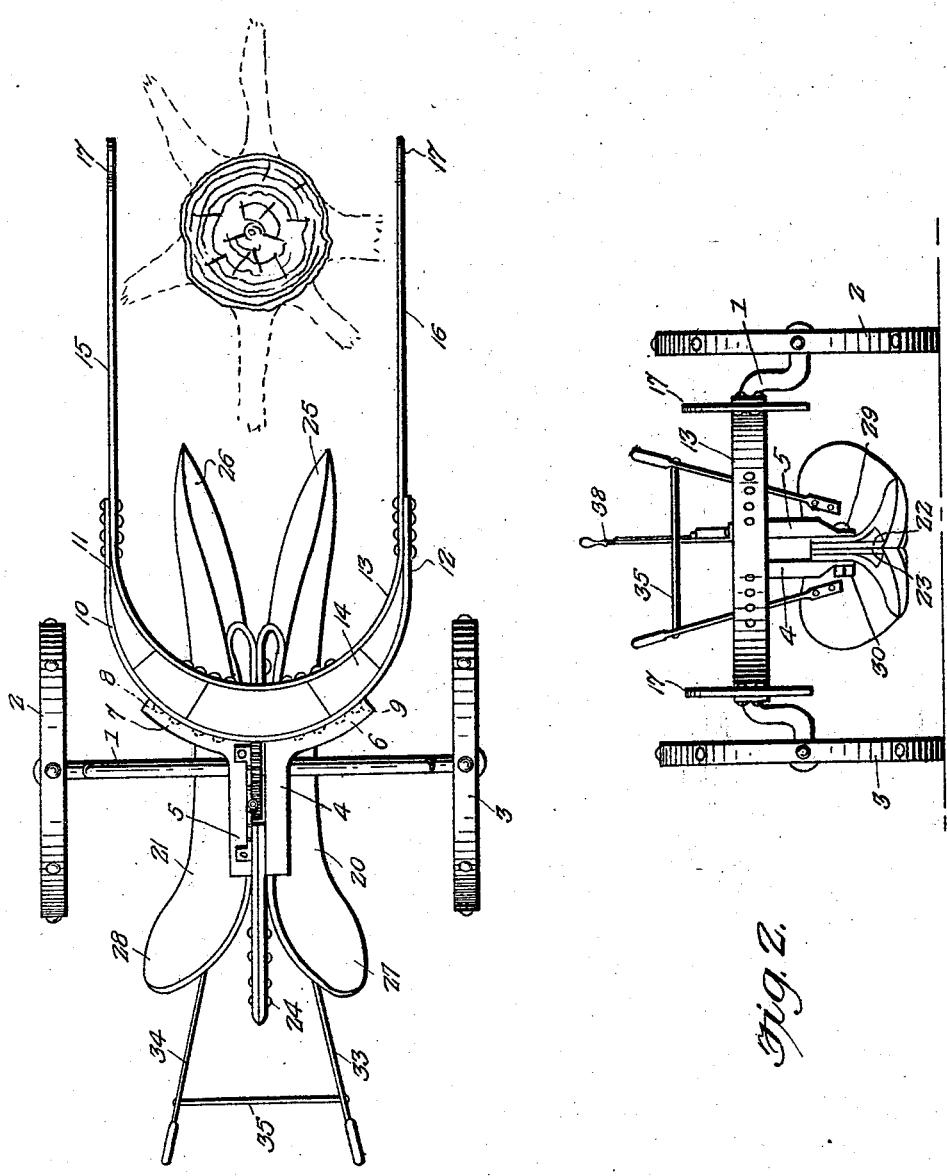
J. W. Nissrod, INVENTOR.
BY
Geo. P. Kimmel, ATTORNEY.

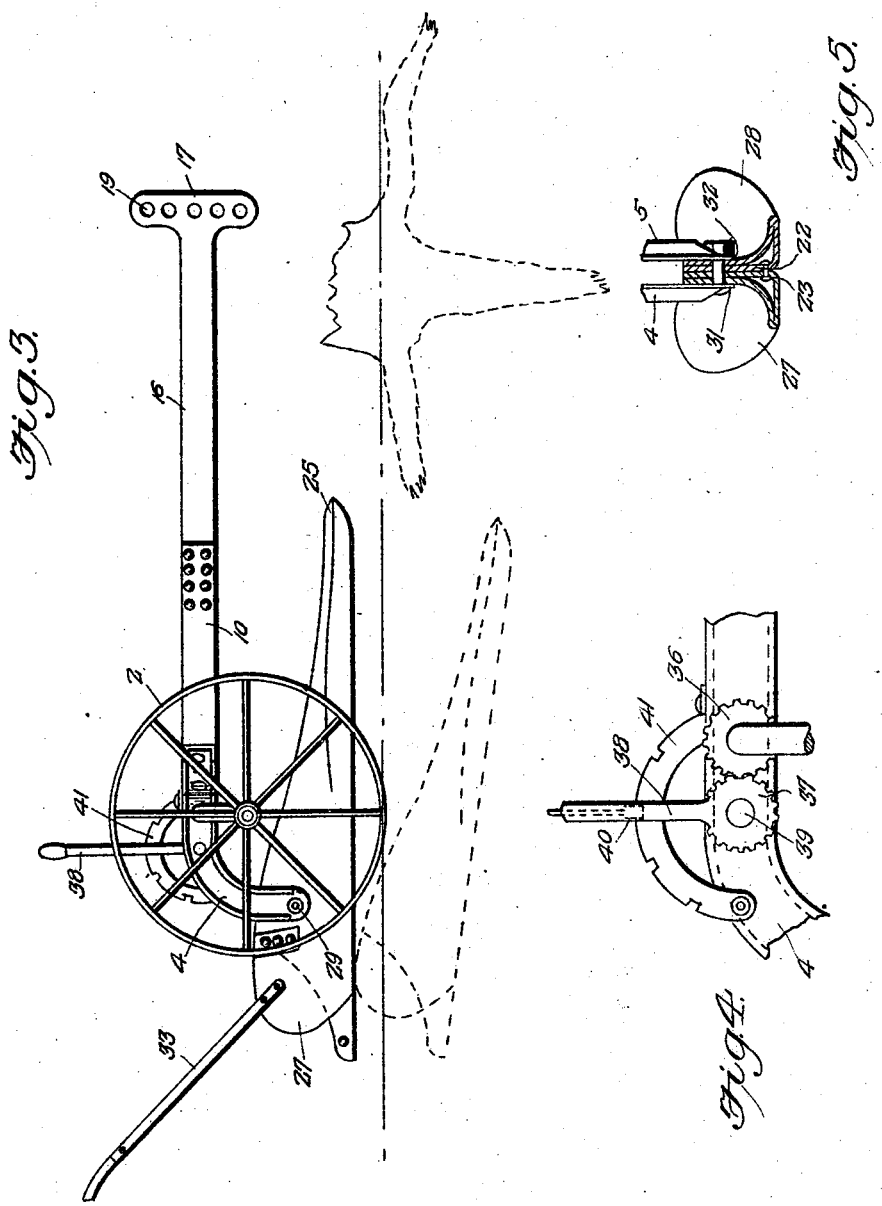

UNITED STATES PATENT OFFICE.

JOHN WILLIAM NISSROD, OF JACKSONVILLE, FLORIDA.

STUMP PULLER.

1,420,736. Specification of Letters Patent. Patented June 27, 1922.

Application filed November 22, 1920. Serial No. 425,710.

*To all whom it may concern:*

Be it known that I, JOHN WILLIAM NISSROD, a citizen of the United States, residing at Jacksonville, in the county of Duval and State of Florida, have invented certain new and useful Improvements in Stump Pullers, of which the following is a specification.

This invention relates to stump pulling devices and more particularly to that class of structures particularly adapted to uproot and extract comparatively low, burned out stumps.

One of the objects of my invention is the construction of a device particularly adaptable for removing dead or burned out stumps which lie beneath the surface of the ground and which do not readily permit chains to be attached thereto.

Another object of the invention is directed to a stump puller and extractor which thoroughly loosens the ground about the stump and its roots thus enabling the same to be removed from the ground with a minimum amount of power.

Another object of the invention will be found in the provision of readily transporting the stump puller to and from the field of operation and additional provision of regulating the depth of penetration of the plow in the ground.

A still further object of the invention relates to a new and novel sub-soil plow for turning and loosening the soil about low lying burnt out stumps and their roots which cannot otherwise be extracted by attaching chains or other extracting means.

With these objects in view and others which will be manifest and suggested as the nature and purpose of the invention are revealed in the following specification and drawing wherein I have shown a practical, yet preferred embodiment thereof.

Figure 1 is a plan view.

Fig. 2 is a front view of the same.

Fig. 3 is a side view.

Fig. 4 is a detail view of the adjusting means for the plow.

Fig. 5 is a detail showing the connection of the plow sections and beams.

Similar numerals designating corresponding parts throughout the specification and drawing, numeral 1 designates an arched axle supporting the usual ground wheels 2, 3 whereby the machine may be transported to and from the field. The said axle 1 passes through a pair of parallel, downwardly suspended plow supporting beams 4, 5 preferably constructed of angle iron and which are connected to the plow beams in the manner subsequently to be described.

The forward portions of each of said beams are curved outwardly in opposite directions as clearly shown at 6, 7 in Fig. 1 and are permanently bolted at 8, 9 respectively to a substantially U-shaped flat steel bar 10 to the sides 11, 12 of which another flat U-shaped bar 13 is riveted as further shown in Fig. 3 of the drawing. A series of blocks 14 are interposed between the said flat steel bars 10, 13 which together constitute a light, harness crescent. The forwardly extending parallel harness bars 15, 16 terminate in right angle, draft attaching members 17, 18 which are apertured as at 19 thereby permitting adjustment of the draft and regulate the angular penetration of the plow as desired.

The plow proper comprises a pair of parallel extending plow shares 20, 21 having vertical, inner meeting faces 22, 23 riveted together as at 24. The forward extremities of the plow shares terminate in diverging, prismatic extensions 25, 26, which are preferably forced into shape from the steel plate, and the rear extremities of the said shares diverge as shown at 27, 28.

The plow is supporting by the transverse pivot bolt 29 and securing nut 30 which secures the said plow to the lower reduced portions 31, 32 of the depending plow beams 4, 5. Rearwardly extending directing handles 33, 34 connected by the brace 35 are secured to the diverging rear portions of the plow and it will be readily seen that the operator may tilt the plow on the pivot bolt 29 when desired.

A toothed gear 36 mounted on the crank axle and intermediate thereof and between the respective plow shares is adapted to mesh with a gear 37 on the end of a lever 38 which is pivoted at 39 in the plow beam. The lever 38 is provided with the usual spring pressed dog 40 and operates on the notched segment rack 41 also bolted to the said beam. In this manner it will be readily seen that by adjusting the lever the crank axle may be turned and the plow raised or lowered when it is desired to use the same or transport it from the field.

In the actual operation of the machine, it is transported to within approximately fifteen feet of the stump and the plow lowered. The draft means is then hitched to the desired aperture in the forward, parallel harness bars and as the machine is dragged forward the operator directs and tilts the plow on the pivot bolt and then permits it to dig in of its own accord. The prismatic shears enter the ground and thoroughly loosen the same about the stump which may readily be removed with a minimum amount of power.

In the accompanying drawings, I have illustrated my invention embodied in one form by way of example, and which in practice has been found to be highly satisfactory in obtaining the desired results. It will be obvious however that other embodiments may be adopted, and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

What I claim is:

1. In a stump puller of the class described, an arched axle, ground wheels supported by said axle, downwardly extending beams supported from said axle, a horizontally pivoted plow structure carried by the lower ends of said beams, said plow structure comprising a pair of parallel, connected shares and prismatic diverging forward extensions formed with said shares, manual means for tilting said plow on its pivot and adjustable draft means for regulating the plowing depth of the diverging extensions.

2. In a stump puller of the class described, an arched axle, ground wheels supported by said axle, downwardly extending beams supported from said axle, an elongated, forwardly and rearwardly diverging plow body horizontally pivoted to said downwardly extending beams, a pinion carried by said axle, a gear carrying lever meshing with said pinion for raising and lowering the plow body from the ground, means to tilt said plow body and adjustable draft means to transport and operate said stump puller.

3. In a stump puller of the class described, an arched axle, ground wheels supported by said axle, downwardly extending parallel beams supported from said axle, a harness crescent permanently secured to the forward terminals of said beams, draft bars extending forwardly of said crescent, adjustable means on the forward extremities of said draft bars, a horizontally pivoted plow structure carried by the lower ends of the downwardly extending beams, prismatic, diverging members formed on said plow, means to raise or lower said plow and means to tilt said plow on its horizontal pivot.

4. In a stump puller of the class described, an arched axle, ground wheels supported by said axle, downwardly extending beams supported from said axle, a harness crescent secured to the forward outwardly curved terminals of said beams, parallel draft bars extending forwardly of said harness crescent, and provided with bolt holes therein for adjusting the angular pull of the machines, a horizontally pivoted plow structure carried by the lower extremities of the downwardly extending beams, said plow structure comprising a pair of parallel plow shares having their inner sides riveted together and terminating in forwardly extending diverging prismatic members, the rear bodies of said shares diverging from the sides thereof, handles connected to said shares for tilting the plow body, and a gear carrying lever for raising or lowering the plow from the ground.

In testimony whereof I affix my signature hereto.

JOHN WILLIAM NISSROD.